(12) United States Patent
Omori

(10) Patent No.: US 10,979,579 B2
(45) Date of Patent: Apr. 13, 2021

(54) IMAGE PROCESSING APPARATUS, CONTROL METHOD, AND STORAGE MEDIUM THAT CONDUCT A SEARCH FOR FIRST AND SECOND ATTRIBUTE INFORMATION OF WHICH ARE INCLUDED IN A PLURALITY OF DESTINATION INFORMATION REGISTERED IN AN ADDRESS BOOK

(71) Applicant: CANON KABUSHIKI KAISHA, Tokyo (JP)

(72) Inventor: Seiya Omori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/846,047

(22) Filed: Apr. 10, 2020

(65) Prior Publication Data
US 2020/0344366 A1 Oct. 29, 2020

(30) Foreign Application Priority Data

Apr. 26, 2019 (JP) .............................. JP2019-086271

(51) Int. Cl.
*H04N 1/00* (2006.01)
(52) U.S. Cl.
CPC ..... *H04N 1/00244* (2013.01); *H04N 1/00408* (2013.01)
(58) Field of Classification Search
CPC ........................ H04N 1/00244; H04N 1/00408
See application file for complete search history.

(56) References Cited

U.S. PATENT DOCUMENTS

| 2009/0177624 | A1* | 7/2009 | Ahlin | H04L 61/1552 |
| 2014/0258329 | A1* | 9/2014 | Koh | G06F 16/3344 707/769 |
| 2019/0068834 | A1* | 2/2019 | Ichikawa | H04N 1/4413 |

FOREIGN PATENT DOCUMENTS

JP 2014-211812 A 11/2014

* cited by examiner

*Primary Examiner* — Juan M Guillermety
(74) *Attorney, Agent, or Firm* — Canon U.S.A., Inc. IP Division

(57) ABSTRACT

A destination information list window includes a column of first attribute information but does not include a column of second attribute information. In a case where the first attribute information included in destination information is hit based on an input search key, the first attribute information included in the destination information is displayed and the second attribute information included in the destination information is not displayed, as a search result, in the column of the first attribute information. In a case where the second attribute information included in the destination information is hit based on the input search key, not only the first attribute information but also the second attribute information included in the destination information are displayed, as the search result, in the column of the first attribute information.

8 Claims, 13 Drawing Sheets

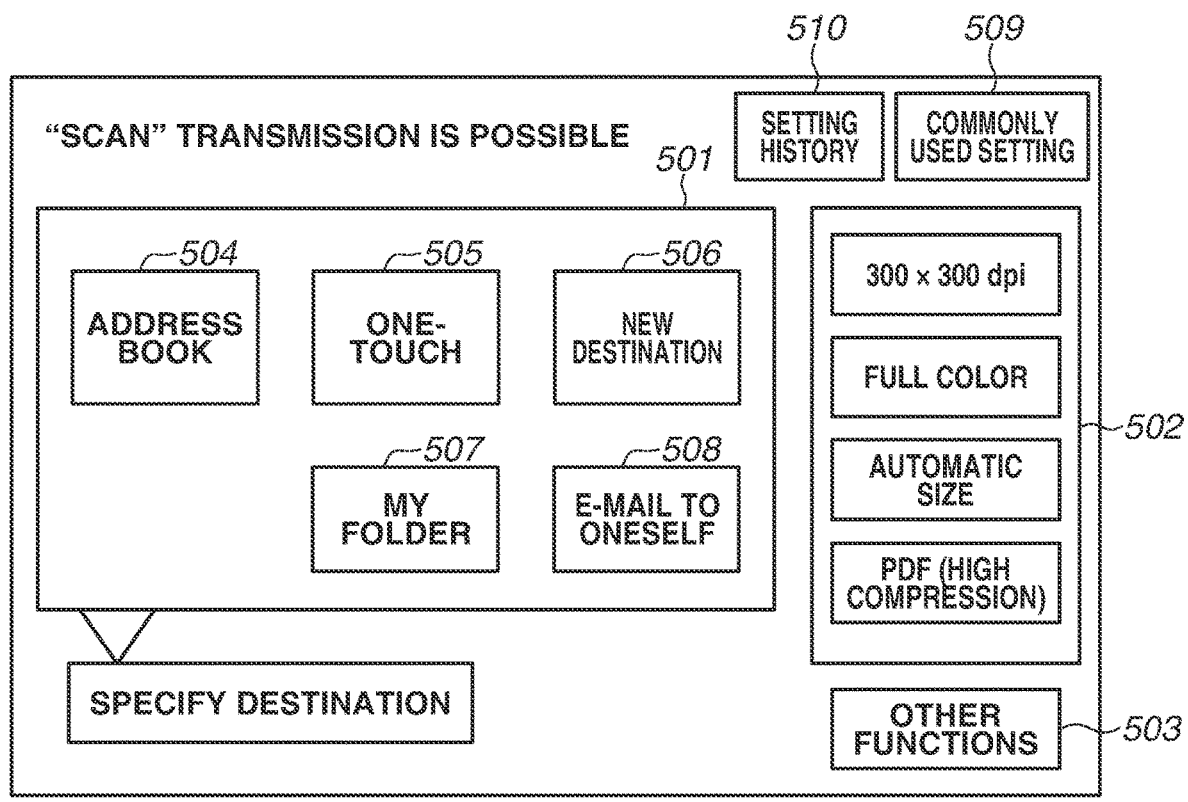

FIG.6A

| | TYPE | NAME | DESTINATION |
|---|---|---|---|
| ☐ | E-MAIL | YAMADA | yamada@office.com |
| ☐ | E-MAIL | SUZUKI | suzuki@office.com |
| ☐ | FILE | SERVER 1 | \\SMBHost.server.com |
| ☐ | FILE | SERVER 2 | FTPHost.server.com |
| ☐ | FAX | A CORPORATION | 045-123-4567 |
| ☐ | FAX | B CORPORATION | 03-456-7890 |
| ☐ | GROUP | SALES DIVISION 1 | 6 DESTINATIONS |
| ☐ | GROUP | SALES DIVISION 3 | 13 DESTINATIONS |

ADDRESS BOOK — ALL ADDRESS BOOKS ▽

REGISTER · EDIT · SEARCH · CANCEL · OK 601, 602, 603, 604, 605, 606, 607

FIG.6B

Same address book table. Overlay: INPUT KEYWORD. (608)

FIG.6C

Same address book table. Popup (609):
- E-MAIL
- FAX
- FILE
- GROUP

FIG.7A

< E-MAIL >

701 — NAME [ ]   703 — DESTINATION LIST 1 ▽

702 — PHONETIC TEXT [ ]

704 — E-MAIL ADDRESS [ ]

705 — CANCEL   706 — OK

FIG.7B

< FAX >

NAME [ ]   DESTINATION LIST 1 ▽

PHONETIC TEXT [ ]

707 — FAX NUMBER [ ]   708

PAUSE   TONE   LINE NUMBER [LINE 1 ▽]

SPACE

F NET   ☐ DETAILED SETTING

CANCEL   OK

FIG.7C

< FILE >

NAME [ ]   DESTINATION LIST 1 ▽

PHONETIC TEXT [ ]

PROTOCOL [SMB ▽] — 709

710 — HOST NAME [ ]
711 — FOLDER NAME [ ]
712 — USER NAME [ ]
713 — PASSWORD [ ]

CANCEL   OK

FIG.8

| | 801 | 807 | 802 | 803 |
|---|---|---|---|---|
| 800 | TYPE | IMPORTANCE | MASTER ATTRIBUTE INFORMATION | SLAVE ATTRIBUTE INFORMATION |
| 804 | E-MAIL | LOW | NAME | PHONETIC TEXT |
| | | | E-MAIL ADDRESS | — |
| 805 | FAX | HIGH | NAME | PHONETIC TEXT |
| | | | FAX NUMBER | LINE NUMBER |
| 806 | FILE | LOW | NAME | PHONETIC TEXT |
| | | | HOST NAME | PROTOCOL |
| | | | | FOLDER NAME |
| | | | | USER NAME |

IMAGE PROCESSING APPARATUS, CONTROL METHOD, AND STORAGE MEDIUM THAT CONDUCT A SEARCH FOR FIRST AND SECOND ATTRIBUTE INFORMATION OF WHICH ARE INCLUDED IN A PLURALITY OF DESTINATION INFORMATION REGISTERED IN AN ADDRESS BOOK

BACKGROUND OF THE INVENTION

Field of the Invention

The present disclosure relates to an image processing apparatus, a control method, and a storage medium.

Description of the Related Art

In recent years, an image processing apparatus such as a multi-function peripheral has a function for transmitting data of a scanned document to an external apparatus using various communication protocols. For example, the data of the scanned document can be e-mailed, faxed, or transmitted to a file server. At this time, an address book function of the image processing apparatus can be used as a convenient function. The address book function is for registering, in advance, attribute information such as an e-mail address, a facsimile (fax) number, and file server information to be a transmission destination. The attribute information to be registered includes a name of a destination, a line number for fax transmission, and login information about a file server. When a transmission destination is set for actual transmission of data of a scanned document, a destination already registered in an address book only has to be selected. As a result, troublesome tasks to input e-mail addresses and fax numbers are saved, and thus user operability is improved.

Further, the address book function of the image processing apparatus has a search function. Use of the search function makes a user easily select desired destination information from a list of destination information registered a lot in the address book. On the other hand, the address book search function of a conventional image processing apparatus conducts only a keyword search for specific attribute information in the information registered in the address book. For example, the search can be conducted only by a name of a transmission destination in the address book.

As a document file search technique, Japanese Patent Application Laid-Open No. 2014-211812 discusses an information processing apparatus (personal computer [PC]) that displays search results of a document file using attribute information. In Japanese Patent Application Laid-Open No. 2014-211812, in a case where search results are hit by a search using attribute information, which is not displayed before the search, on a screen showing a list of document files, a column for the attribute information is added. In such a manner, the search results are displayed.

In destination information saved in the image processing apparatus, first attribute information is associated with second attribute information. The first attribute information is displayed in the list of the destination information, and the second attribute information is not displayed in the list of the destination information. For example, the first attribute information includes names and fax numbers. The second attribute information associated with the first attribute information includes phonetic texts and line numbers.

In Japanese Patent Application Laid-Open No. 2014-211812, in a case where search results are hit by the search using attribute information, which is not displayed before the search, a column for displaying the attribute information is added to the screen to show the search results. In such a manner, the search results are displayed on the screen. However, when the column is added for display, the association of attribute information might be hard to understand.

SUMMARY OF THE INVENTION

The present disclosure is directed to displaying attribute information in a search result without adding a column for the attribute information in a case where the search result is hit by the attribute information, which is not displayed in a list of destination information.

According to an aspect of the present disclosure, an image processing apparatus includes a memory storing instructions and a plurality of destination information, and a processor that executes the instructions causing the image processing apparatus to accept input of a search key, conduct a search for first attribute information and second attribute information associated with the first attribute information both of which are included in the plurality of destination information, based on the input search key, and display destination information hit by the search as a result of the conducted search. A list window of the destination information includes a column of the first attribute information but does not include a column of the second attribute information. In a case where the first attribute information included in the plurality of destination information is hit based on the input search key, the first attribute information included in the destination information is displayed and the second attribute information included in the destination information is not displayed, as the search result, in the column of the first attribute information. In a case where the second attribute information included in the plurality of destination information is hit based on the input search key, not only the first attribute information but also the second attribute information included in the destination information are displayed, as the search result, in the column of the first attribute information.

Further features of the present disclosure will become apparent from the following description of exemplary embodiments with reference to the attached drawings.

BRIEF DESCRIPTION OF THE DRAWINGS

FIG. 5 illustrates an example of a scanning operation screen.

FIGS. 6A, 6B, and 6C illustrate examples of an address book screen.

FIGS. 7A, 7B, and 7C illustrate examples of a new destination registration screen.

FIG. 8 illustrates an example of a definition table of master attribute information and slave attribute information.

DESCRIPTION OF THE EMBODIMENTS

An exemplary embodiment of the present disclosure will be described below with reference to the drawings.

Figure 1:
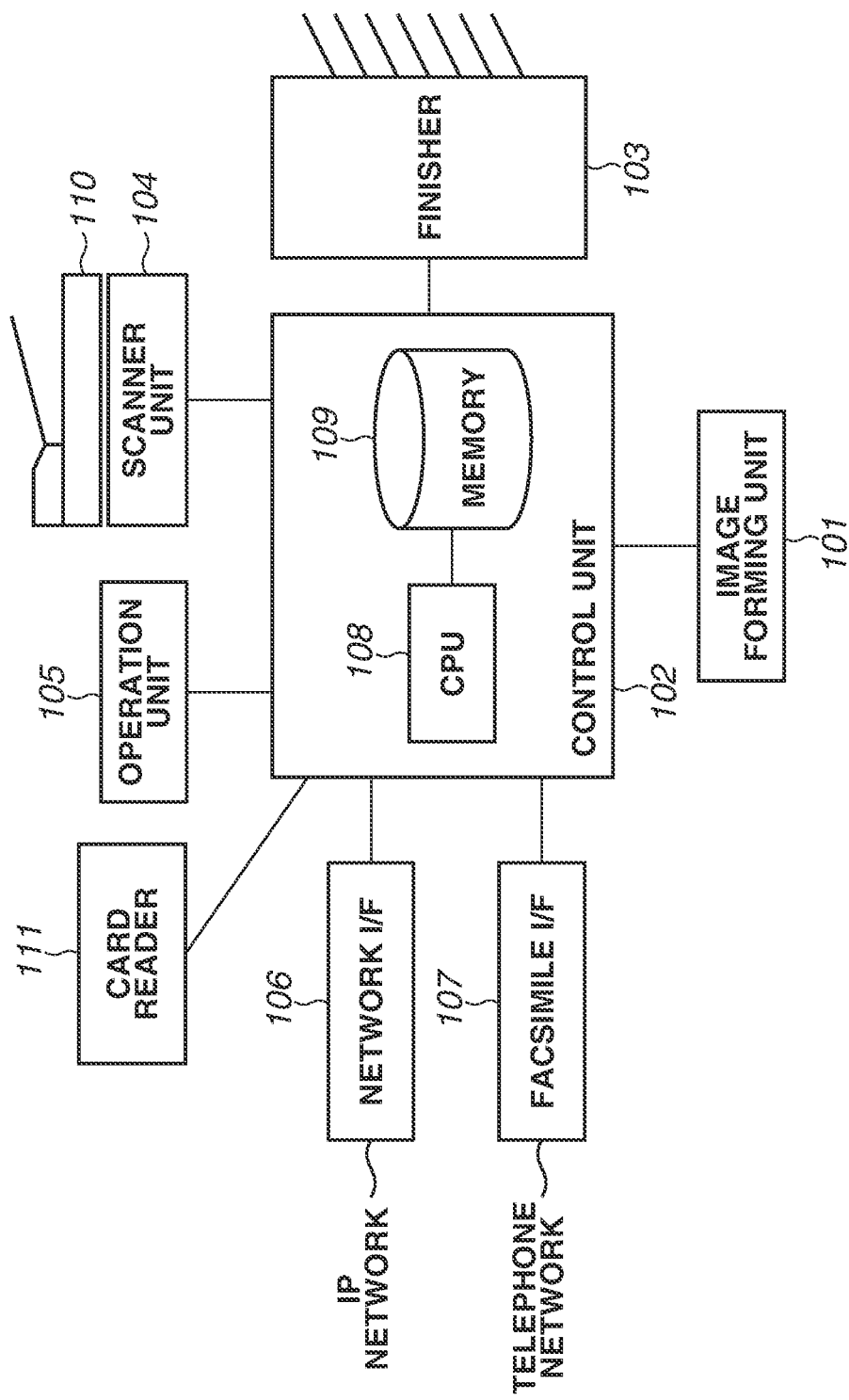
FIG. 1 is a diagram illustrating a schematic configuration of an image processing apparatus.

FIG. 1 is a diagram illustrating a schematic configuration of a multi-function peripheral (MFP) according to the present exemplary embodiment to which an image communication apparatus is applied. This MFP includes an image forming unit 101 that forms an image on recording paper using an electrophotographic method, and a control unit 102 that controls the MFP. The MFP further includes a finisher 103 that executes post processing such as staple processing, a scanner unit 104 that reads an original document placed on a platen glass, and an operation unit 105 that receives various data and commands.

The MFP further includes a network interface (I/F) 106 that transmits and receives image data via a network, and a facsimile (fax) interface 107 that transmits and receives fax data. The MFP further includes an automatic document feeding device (feeder) 110 that reads images while sequentially feeding a plurality of original documents, and a card reader 111 that authenticates a user who uses the MFP. These units 101, 103 to 107, 110, and 111 are connected to the control unit 102 by dedicated interfaces.

The control unit 102 includes a central processing unit (CPU) 108 and a storage device (memory) 109 that configure a main unit. The memory 109 is a storage unit that stores a control program related to a flowchart of the MFP in FIG. 9, and destination information, described below. Further, the memory 109 stores a control program of setting a dialog box illustrated in FIGS. 4 to 8, and 10, and contents where operation screen information is described. The MFP according to the present exemplary embodiment does not always have to include the whole configuration illustrated in FIG. 1.

Figure 2:
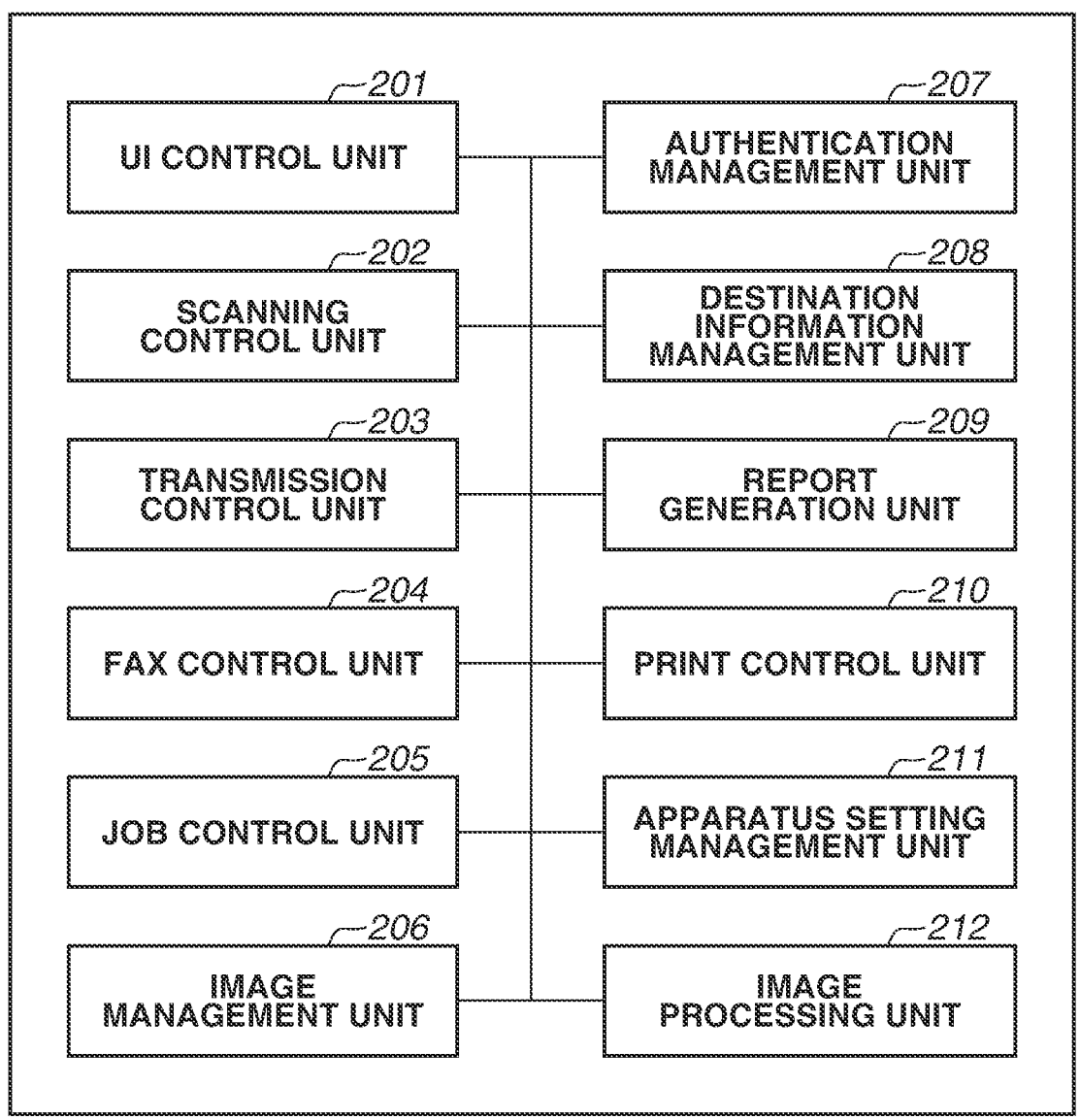
FIG. 2 is a diagram illustrating a software configuration that controls the image processing apparatus.

FIG. 2 is a diagram illustrating a software configuration that controls the MFP according to the present exemplary embodiment.

A user interface (UI) control unit 201 displays an operation screen on the operation unit 105, and controls a UI that accepts user operations. A scanning control unit 202 controls the scanner unit 104 and the feeder 110, and controls processing for reading a document image. A transmission control unit 203 controls processing for transmitting image data read by the scanning control unit 202 to a destination specified by a user using the network interface 106. Specifically, the transmission control unit 203 controls e-mail transmission and transmission to a file server.

A fax control unit 204 controls transmission and reception of Group III (G3) fax using the facsimile interface 107. A job control unit 205 manages a transmission request accepted by the UI control unit 201 from a user, and an execution status and a history of the transmission request. An image management unit 206 manages management information about an image read by the scanner unit 104. An authentication management unit 207 specifies a user who uses the MFP based on information read by the card reader 111 or information input by the user through the operation unit 105, and manages information about the specified user.

A destination information management unit 208 manages information about a transmission destination that is used in the transmission processing. A report generation unit 209 generates various reports that include setting values of the apparatus and results of job execution. A print control unit 210 controls printing of image data read by the scanner unit 104, a received fax document, and a transmission result report onto paper using the image forming unit 101.

An apparatus setting management unit 211 saves and manages various settings of the apparatus. An image processing unit 212 provides various image processing functions such as conversion, rotation, and combining of images stored in the image management unit 206. Control software of these functions is stored in the memory 109, and is executed by the CPU 108.

Figure 3:
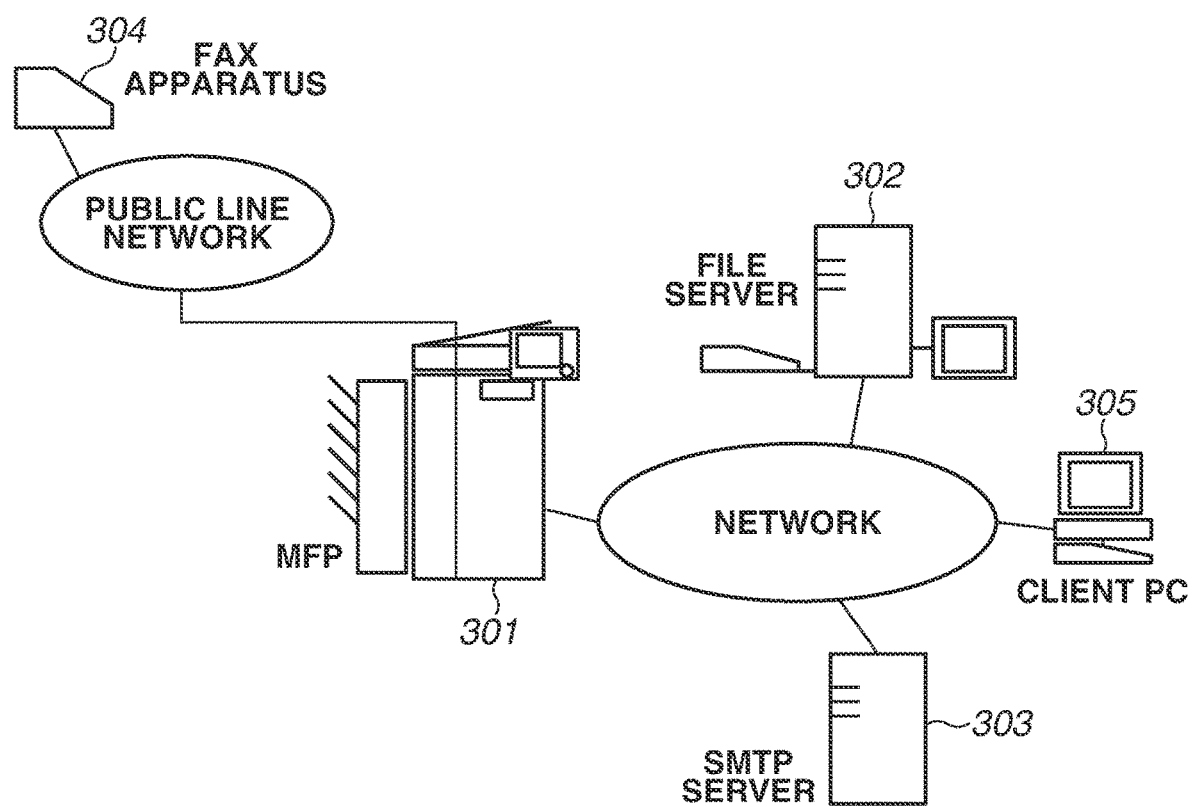
FIG. 3 is a diagram illustrating a system to which an exemplary embodiment is applied.

FIG. 3 is a diagram illustrating a system to which the present exemplary embodiment is applied.

In this drawing, the present disclosure is applied to an MFP 301. The system includes a file server 302 that is a transmission destination of network scanning, a Simple Mail Transfer Protocol (SMTP) server 303 to be used in e-mail transmission, a client personal computer (PC) 305 that receives an e-mail. They are connected to the MFP 301 via a network. A G3 fax device 304 is connected to the MFP 301 via a public line network. A user specifies a transmission destination and detailed settings for the transmission on an operation screen, described below, of the MFP 301 to perform transmission to a desired destination.

Figure 4:
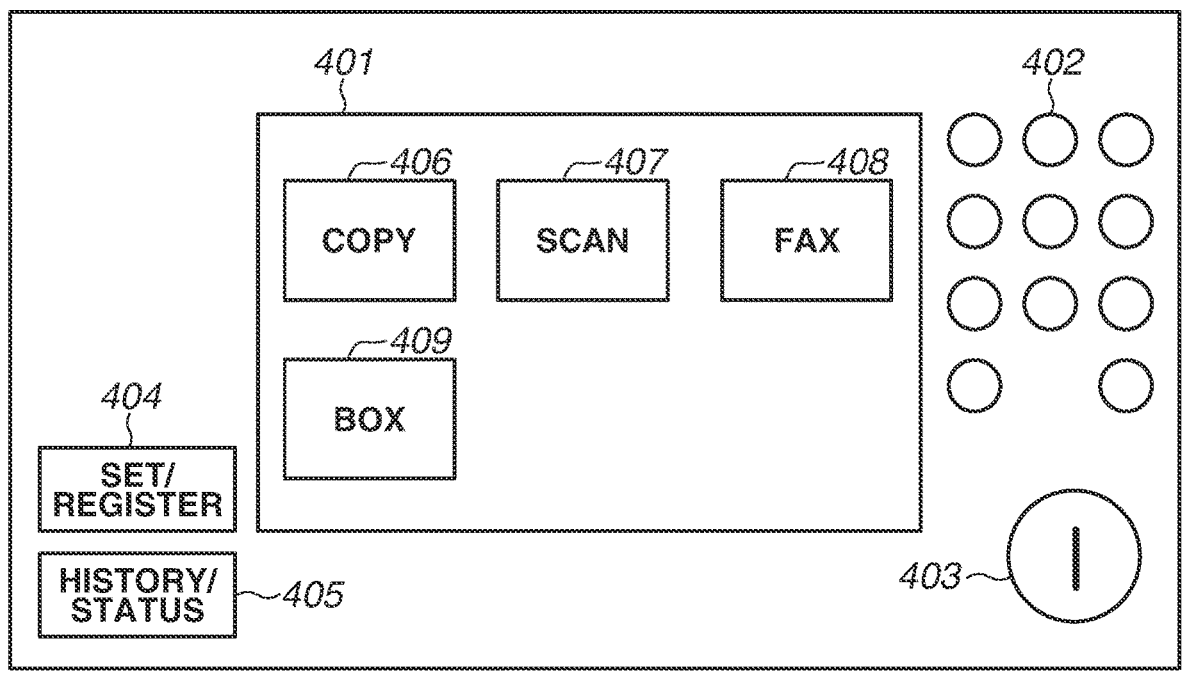
FIG. 4 illustrates an example of an operation unit and a home screen.

FIG. 4 illustrates an example of the operation unit 105 and a home screen to be displayed on the operation unit 105.

In this drawing, application selecting buttons are displayed on a display area 401. The buttons call up suitable operation screens, respectively, based on an instruction from the user. In this example, a "Copy" button 406, a "Scan" button 407, a "Fax" button 408, and a "Box" button 409 are displayed. These buttons 406 to 409 call up operation screens of a copying function, a network scanning function, a fax function, and a box function, respectively.

The operation unit 105 includes a numeric keypad 402, and a start key 403 that instructs starting of a job. The operation unit 105 further includes a "Set/Register" screen call button 404 that calls a setting screen of the apparatus, and a "History/Status" button 405 that calls a history and status screen of a job. The buttons 403 to 405 can be disposed not as hard buttons on the operation unit 105 but as soft buttons on the display area 401.

FIG. 5 illustrates an example of a scanning operation screen to be displayed on the operation unit 105 by a user pressing the "Scan" button 407.

The drawing indicates destination input buttons 501, each of which is to be pressed by a user to specify a transmission destination. When the user presses an "Address book"

button 504, an address book screen is displayed. The user selects a desired destination from the registered destinations in a displayed list to be capable of setting the selected destination as the transmission destination. When the user presses a "One-touch" button 505, a one-touch button selection screen is displayed. The user presses a registered one-touch button for a desired destination to be capable of setting the transmission destination.

When the user presses a "New destination" button 506, a transmission type selection screen is displayed, and a destination setting screen based on the transmission type selected by the user is displayed. The user inputs information required for each transmission type to be capable of setting a transmission destination. When the user presses a "My folder" button 507, a destination folder in a file server associated with the user is set as the transmission destination. When the user presses an "E-mail to oneself" button 508, an e-mail address associated with the user is set as the transmission destination. The destination input can be performed by any one of these methods.

A transmission basic setting button 502 is for setting reading conditions such as reading resolution and a reading color mode, and a transmission file format. An "Other functions" button 503 is for calling various detailed settings for reading and transmission. A "Commonly used setting" button 509 is for calling a "Commonly used setting" screen indicating buttons associated with saved transmission settings. A "Setting history" button 510 is for calling settings of transmission jobs, which have been executed in the past.

FIG. 6A illustrates an example of an address book screen to be displayed on the operation unit 105 by the user pressing the "Address book" button 504.

A destination list display area 601 is a display area where a list window of information about destinations registered in the address book is displayed. A type column 602 indicates types of the destinations registered in the address book. A name column 603 indicates names of the destinations registered in the address book. A destination information column 604 indicates information about the destinations registered in the address book. The destination information to be displayed changes based on the types of the registered destinations. In a case where the type indicates an e-mail, the destination information indicates an e-mail address. In a case where the type indicates a fax, the destination information indicates a fax number. In a case where the type indicates a file, the destination information indicates file server information.

A "Register" button 605 is a new destination registration button for registering a new destination in the address book. When the "Register" button 605 is pressed, a pop-up menu illustrated in FIG. 6C appears. An "Edit" button 606 is for editing the registration information about the destination registered in the address book. A "Search" button 607 is for searching a destination registered in the address book using a desired keyword. When the "Search" button 607 is pressed, a search keyword input window illustrated in FIG. 6B appears.

FIG. 6B illustrates an example of a screen where the search keyword input window is displayed on the address book screen on the operation unit 105 by a user pressing the "Search" button 607.

A search keyword input window 608 accepts input of a search key for searching for a desired destination among the destinations registered in the address book. When the search keyword input window 608 is touched, a soft keyboard screen, not illustrated, appears, and thus a keyword can be input. When the soft keyboard screen is closed after the input of a keyword, a destination associated with the keyword input by the user is displayed on the destination list display area 601.

FIG. 6C illustrates an example of a screen where a type selection pop-up menu of a new destination to be registered in the address book is displayed on the operation unit 105 by a user pressing the "Register" button 605.

A pop-up menu 609 is for selecting a type of the new destination to be registered in the address book. The pop-up menu 609 is displayed by pressing the "Register" button 605. One of new destination registration screens illustrated in FIGS. 7A to 7C appears based on the type selected on the pop-up menu 609.

FIGS. 7A to 7C illustrate examples of the new destination registration screen.

FIG. 7A illustrates the example of the screen to be displayed in a case where an "E-mail" is selected as the type on the pop-up menu 609 displayed by a user pressing the "Register" button 605. A name input window 701 is an input window where a name of a new destination to be registered is input. When the name input window 701 is touched, a soft keyboard screen appears, and thus a text can be input. A phonetic text input window 702 is an input window where a phonetic text of a new destination to be registered is input. When the phonetic text input window 702 is touched, a soft keyboard screen appears, and a text can be input. A registration destination table selection pull-down menu 703 is for selecting a destination table in which a new destination is to be registered.

An e-mail address input window 704 is for inputting an e-mail address to be destination information about a new destination to be registered. When the e-mail address input window 704 is touched, a soft keyboard screen appears, and a text can be input. A "Cancel" button 705 is for discarding all information about a new registered destination being currently input in FIG. 7A and returning to the address book screen in FIG. 6A. An "OK" button 706 is for registering the information about the new destination being currently input in FIG. 7A in the address book and returning to the address book screen in FIG. 6A.

FIG. 7B illustrates the example of the screen to be displayed in a case where "Fax" is selected as the type on the pop-up menu 609 displayed by a user pressing the "Register" button 605. A fax number input window 707 is for inputting a fax number to be destination information about a new destination to be registered. A number can be input in the fax number input window 707 with the numeric keypad 402. A line number selection pull-down menu 708 is for selecting a line number in a case where fax transmission is performed for the fax number input in the fax number input window 707.

FIG. 7C illustrates the example of the screen to be displayed in a case where "File" is selected as the type on the pop-up menu 609 displayed by a user pressing the "Register" button 605. A protocol selection pull-down menu 709 is for selecting a type of a protocol of a file server. The protocol includes, for example, Server Message Block (SMB), and Web-based Distributed Authoring and Versioning (WebDAV).

A host name input window 710 is for inputting a host name to be destination information about a new destination to be registered. When the host name input window 710 is touched, a soft keyboard screen appears, and a text can be input. A folder name input window 711 is for inputting a folder name attached to the host name input in the host name input window 710. When the folder name input window 711 is touched, a soft keyboard screen appears, and a text can be input.

A user name input window 712 is for inputting a user name in login information for accessing to the host name input in the host name input window 710. When the user name input window 712 is touched, a soft keyboard screen appears, and a text can be input. A password input window 713 is for inputting a password in the login information for accessing to the host name input in the host name input window 710. When the password input window 713 is touched, a soft keyboard screen appears, and a text can be input.

FIG. 8 illustrates an example indicating a definition table where information to be registered in the address book of the MFP 301 is classified into master attribute information and slave attribute information. This table is saved in the memory 109. In a definition table 800, information to be registered in the address book of the MFP 301 is classified into the master attribute information and the slave attribute information.

A type column 801 indicates types in the information to be registered in the address book of the MFP 301. A master attribute information column 802 indicates master attribute information in the information to be registered in the address book of the MFP 301. The master attribute information is information to be displayed in the name column 603 and the destination information column 604, but is not limited to such information. A slave attribute information column 803 indicates slave attribute information in the information to be registered in the address book of the MFP 301. The slave attribute information is information that is displayed neither in the name column 603 nor in the destination information column 604, but is not limited to such information. The slave attribute information is associated with the master attribute information to be managed.

An e-mail type row 804 indicates the master attribute information and the slave attribute information relating to the "e-mail" type. FIG. 8 illustrates that a name, which is the master attribute information, is associated with a phonetic text, which is the slave attribute information. Further, an e-mail address, which is the master attribute information, is associated with no slave attribute information.

A fax type row 805 indicates the master attribute information and the slave attribute information relating to a "fax" type. FIG. 8 illustrates that a name, which is the master attribute information, is associated with a phonetic text, which is the slave attribute information. Further, a fax number, which is the master attribute information, is associated with a line number, which is the slave attribute information.

A file type row 806 indicates the master attribute information and the slave attribute information relating to a "File" typ. FIG. 8 illustrates that a name, which is the master attribute information, is associated with a phonetic text, which is the slave attribute information. Further, a host name, which is the master attribute information, is associated with a protocol, a folder name, and a user name, which are the slave attribute information.

An importance column 807 indicates importance regarding each type. In FIG. 8, the importance of "Fax" is high, and the importance of "E-mail" and "File" is low. Processing in step S905 of FIG. 9 is executed based on the information in the importance column 807.

Figure 9:
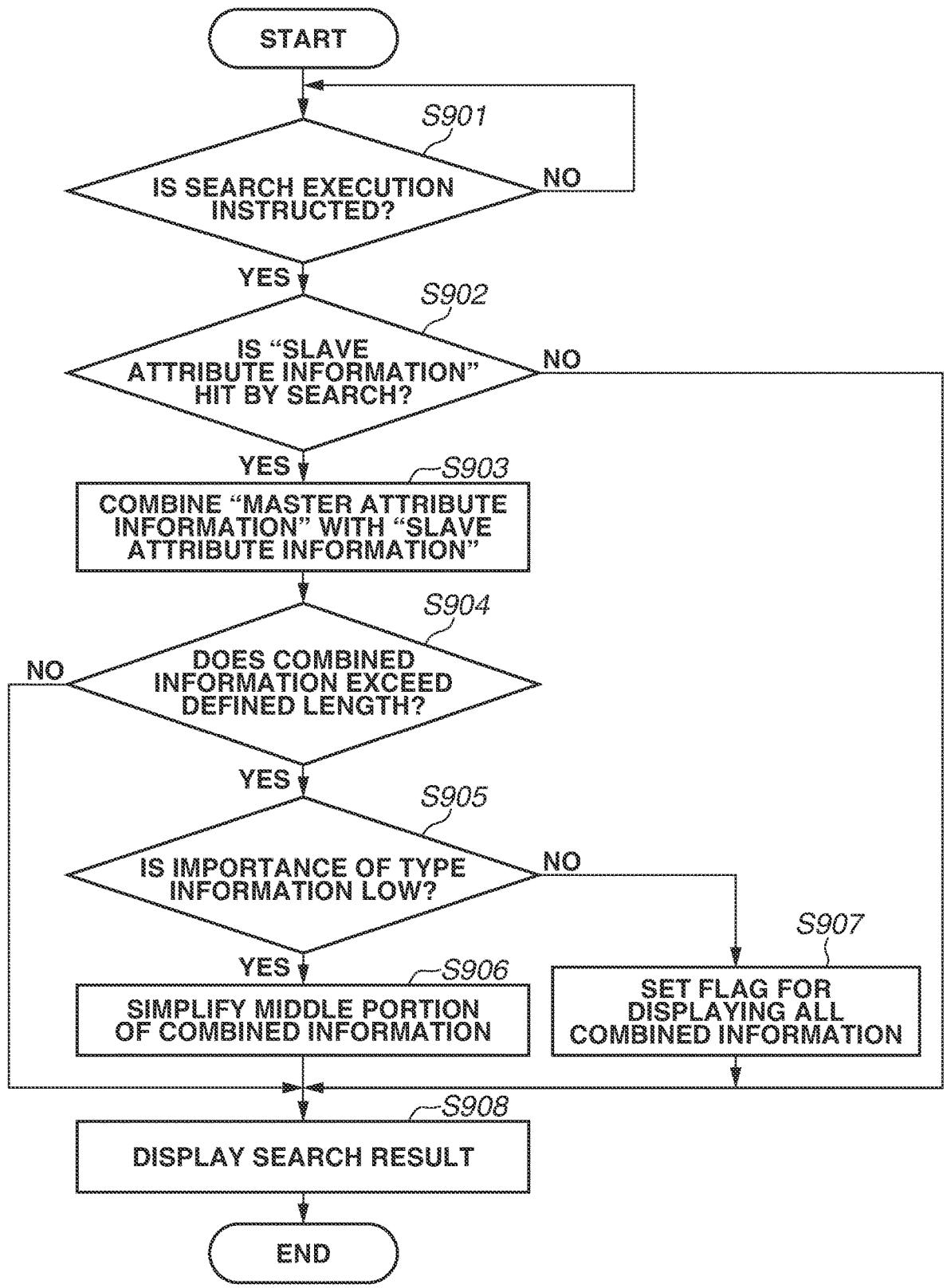
FIG. 9 is a flowchart of displaying address book search results according to the present exemplary embodiment.

FIG. 9 is a flowchart of displaying address book search results according to the present exemplary embodiment. Respective steps in FIG. 9 are executed by the CPU 108 of the MFP 301 executing a program. The program to be executed is called from the memory 109 to start.

In step S901, the CPU 108 determines whether search execution has been instructed. In a case where the CPU 108 determines that the search execution has been instructed (Yes in step S901), the processing proceeds to step S902. In a case where the CPU 108 determines that the search execution has not been instructed (No in step S901), the processing returns to step S901 and waits for a search execution instruction.

The processing in step S902 and thereafter is executed on respective destinations hit by the search one by one.

In step S902, the CPU 108 determines whether attribute information hit by the search is slave attribute information. As a result of the search, in a case where the CPU 108 determines that the slave attribute information has been hit (Yes in step S902), the processing proceeds to step S903. As a result of the search, in a case where the CPU 108 determines that no slave attribute information has been hit (No in step S902), the processing proceeds to step S908.

In step S903, the CPU 108 combines the slave attribute information with master attribute information associated with the slave attribute. In the present exemplary embodiment, the slave attribute is parenthesized after the master attribute information, as a combining method. Thereafter, the processing proceeds to step S904.

In step S904, the CPU 108 determines whether display of the attribute information combined in step S903 protrudes from the name column 603 and the destination information column 604 of the destination list display area 601. In a case where the CPU 108 determines that the display protrudes (Yes in step S904), the processing proceeds to step S905. In a case where the CPU 108 determines that the display does not protrude (No in step S904), the processing proceeds to step S908.

In step S905, the CPU 108 determines importance of the type information about a destination hit by the search. The importance of the type information about the destination is determined based on the information defined in the importance column 807. In a case where the CPU 108 determines that the importance of the type information about the destination is low (Yes in step S905), the processing proceeds to step S906. In a case where the CPU 108 determines that the importance of the type information about the destination is high (No in step S905), the processing proceeds to step S907.

In step S906, the CPU 108 simplifies the attribute information combined in step S903. In the present exemplary embodiment, as a simplifying method, a middle portion of the combined attribute information is indicated by " . . . " to be omitted. Thereafter, the processing proceeds to step S908.

In step S907, the CPU 108 sets a flag for displaying all the attribute information combined in step S903. The flag is saved in the memory 109. Thereafter, the processing proceeds to step S908.

In step S908, the CPU 108 displays the destination hit by the search on the destination list display area 601. At this time, the attribute information to be displayed has been subject to the series of processing in the flowchart of FIG. 9. In a case where the flag has been set after the CPU 108 has read out the flag saved in the memory 109 (i.e., the processing has proceeded from step S907), the CPU 108 displays an animation such that a character string of the combined attribute information flows from right to left. A target on which the animation display is to be performed is in the master attribute information column of the combined attribute information. Specifically, the target is in any one of or a plurality of the type column 602, the name column 603, and the destination information column 604.

Figure 10:
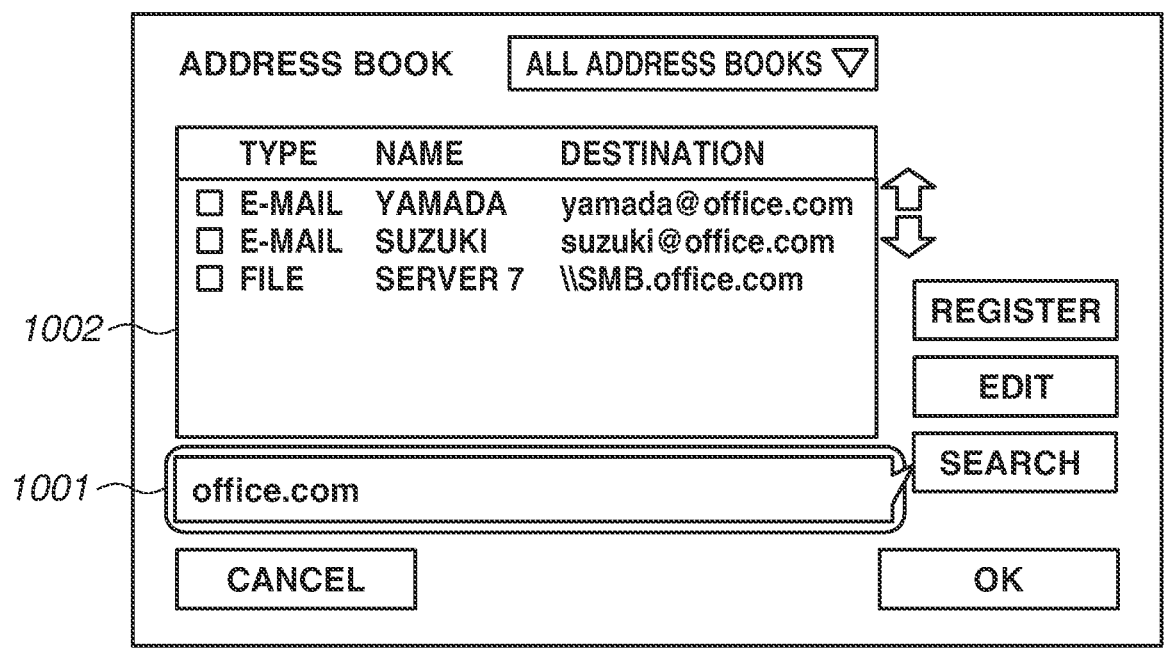
FIG. 10 illustrates an example of an address book search result display screen in a case where the master attribute information is hit by a search in the present exemplary embodiment.
Figure 11:
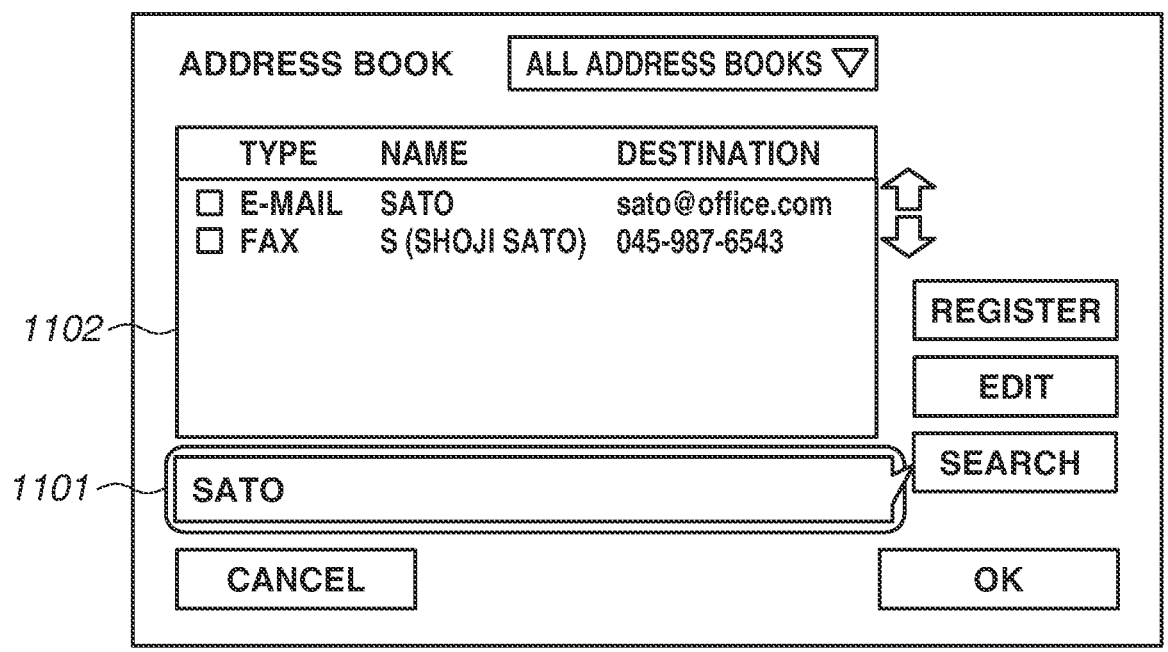
FIG. 11 illustrates an example of an address book search result display screen in a case where the slave attribute information is hit by a search and the slave attribute information can be additionally displayed in a list of the search results in the present exemplary embodiment.

In a case where the processing proceeds from step S902 to step S908, namely, the master attribute information is hit by the search, the CPU 108 displays the searched destination on the destination list display area 601 as illustrated in FIG. 10. In a case where the processing proceeds from step S904 to step S908, namely, the slave attribute information is hit by the search and the display of the combined attribute information does not protrude, the CPU 108 displays the searched destination on the destination list display area 601 as illustrated in FIG. 11.

Figure 12:
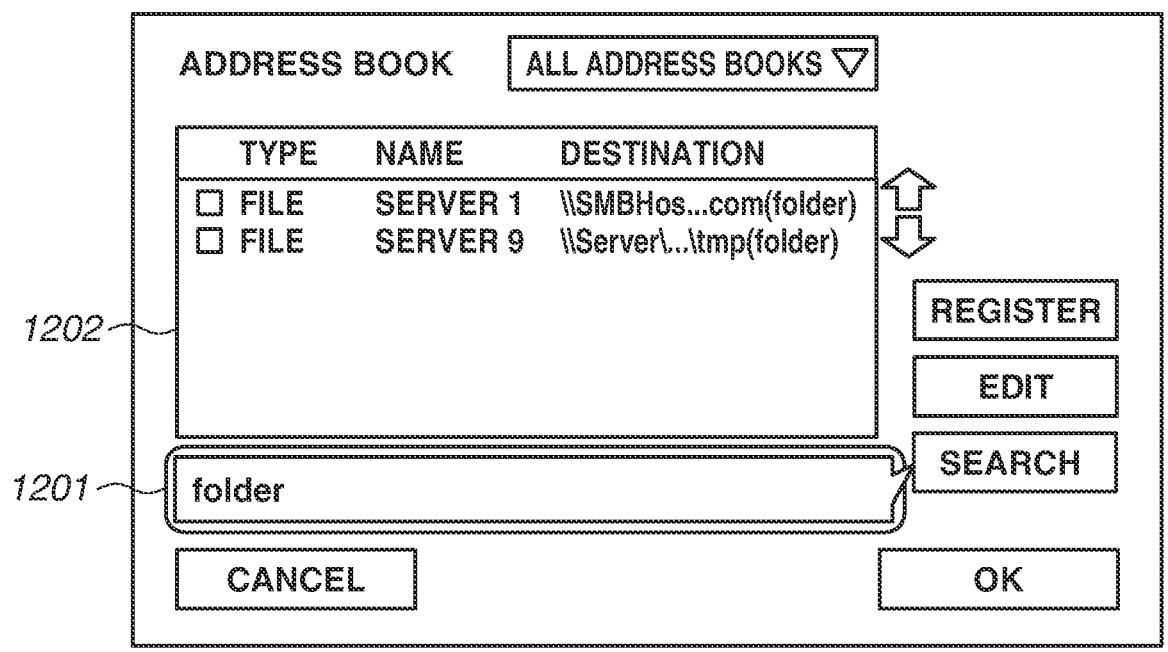
FIG. 12 illustrates an example of an address book search result display screen in a case where the slave attribute information is hit by a search, the slave information cannot be additionally displayed in the list of the search results, and importance of the master attribute information with respect to the slave attribute information is low in the present exemplary embodiment.
Figure 13A:
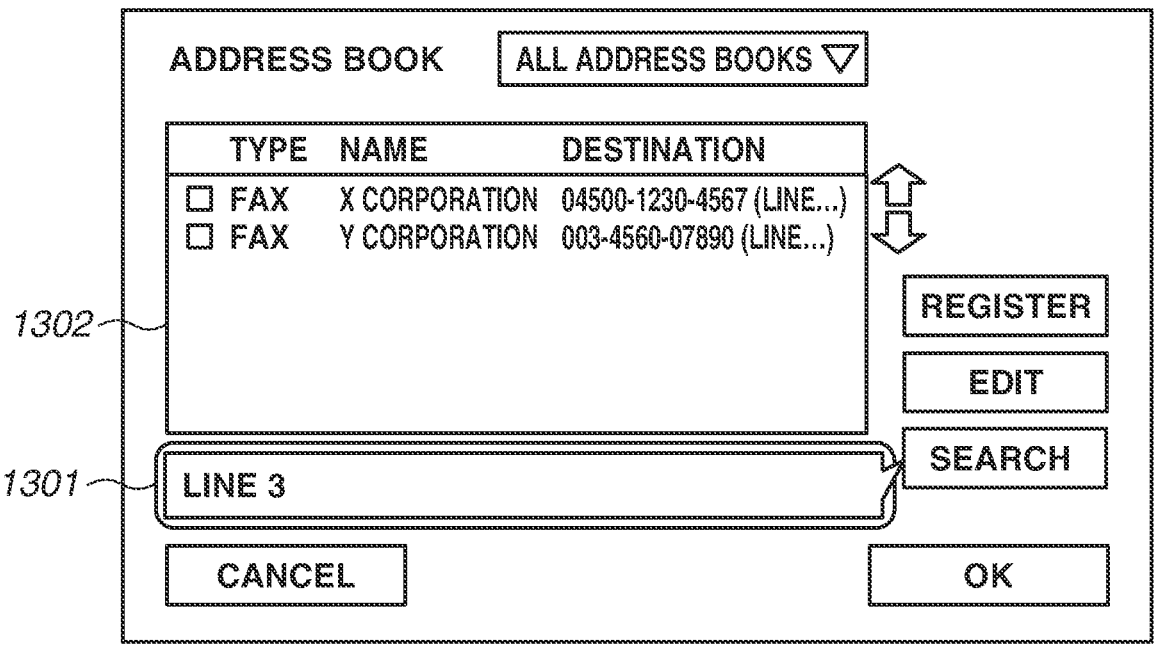
FIGS. 13A and 13B illustrate examples of an address book search result display screen in a case where the slave attribute information is hit by a search, the slave attribute information cannot be additionally displayed in the list of the search results, and the importance of the master attribute information with respect to the slave attribute information is high in the present exemplary embodiment.
Figure 13B:
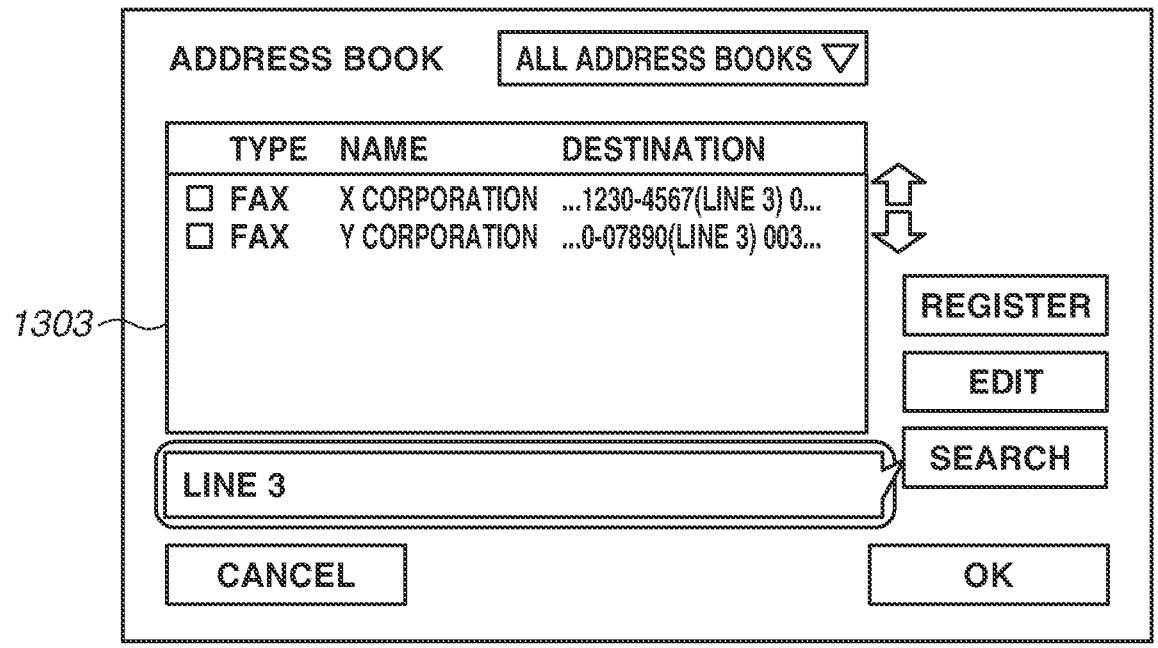

In a case where the processing proceeds from step S906 to step S908, namely, the slave attribute information is hit by the search, the display of the combined attribute information protrudes, and the importance of the type information is low, the CPU 108 displays the searched destination on the destination list display area 601 as illustrated in FIG. 12. In a case where the processing proceeds from step S907 to step S908, namely, the slave attribute information is hit by the search, the display of the combined attribute information protrudes, and the importance of the type information is high, the CPU 108 displays the searched destination on the destination list display area 601 as illustrated in FIGS. 13A and 13B.

FIG. 10 illustrates an example of an address book search result display screen to be displayed on the operation unit 105 in a case where the master attribute information is hit by the search in the present exemplary embodiment.

A search keyword input window 1001 indicates that "office. com" is input into the search keyword input window. A destination list display area 1002 indicates results searched for based on the information in the search keyword input window 1001. In FIG. 10, it is found that a plurality of destinations registered in the address book is hit as a result of the search based on "office. com". FIG. 10 illustrates a display example in a case where the processing proceeds from step S902 to step S908 in the flowchart of FIG. 9.

FIG. 11 illustrates an example of an address book search result display screen to be displayed on the operation unit 105 in a case where the slave attribute information is hit by the search and can be additionally displayed on the list of the search results in the present exemplary embodiment.

A search keyword input window 1101 indicates that "SATO" is input into the search keyword input window. A destination list display area 1102 indicates results searched for based on the information in the search keyword input window 1101. In FIG. 11, as a result of the search using "SATO", no master attribute information is hit, but "SATO" indicated by a phonetic text as the slave attribute information associated with the name, which is the master attribute information, is also hit. FIG. 11 illustrates a display example in a case where the processing proceeds from step S904 to step S908 in the flowchart of FIG. 9.

FIG. 12 illustrates an example of an address book search result display screen to be displayed on the operation unit 105 in a case where the slave attribute information is hit by the search, the slave attribute information cannot be additionally displayed in the search result list, and the importance of the master attribute information with respect to the slave attribute information is low in the present exemplary embodiment.

A search keyword input window 1201 indicates that "folder" is input into the search keyword input window. A destination list display area 1202 indicates results searched for based on the information in the search keyword input window 1201. In FIG. 12, it is found that, as a result of the search using "folder", no master attribute information is hit by the search, but "folder" is hit by a folder name, which is the slave attribute information associated with a host name, which is the master attribute information. Further, FIG. 12 illustrates simplified combined information on a destination list display area 1006 as a result of combining the host name, which is the master attribute information with the folder name, which is the slave attribute information. The combined information is simplified because the combined information protrudes from the destination information column 604, and the importance of the file type information is low. FIG. 12 illustrates a display example in a case where the processing proceeds from step S906 to step S908 in the flowchart of FIG. 9.

FIG. 13A illustrates an example of the address book search result display screen to be displayed on the operation unit 105 in a case where the slave attribute information is hit by the search, the slave attribute information cannot be additionally displayed in the search result list, and the importance of the master attribute information with respect to the slave attribute information is high in the present exemplary embodiment.

A search keyword input window 1301 indicates that "LINE 3" is input into the search keyword input window. A destination list display area 1302 indicates results searched for based on the information in the search keyword input window 1301. In FIG. 13A, as a result of the search using "LINE 3", it is found that no master attribute information is not hit by the search, but "LINE 3" is hit by a line number, which is slave attribute information associated with a fax number, which is the master attribute information. Further, in FIG. 13A, after the fax number, which is the master attribute information, is combined with the line number, which is the slave attribute information, the combined information cannot be displayed within the destination information column 604, and the importance of the fax type information is high. Thus, the combined information is displayed on the destination list display area 1302 in a flowing manner. FIG. 13A illustrates a display example in a case where the processing proceeds from step S907 to step S908 in the flowchart of FIG. 9.

FIG. 13B is a diagram that supplements FIG. 13A.

On a destination list display area 1303 of FIG. 13B, it is more understandable that the information is displayed in the destination information column 604 in the flowing manner than the destination list display area 1302 of FIG. 13A. The display in the flowing manner means, for example, display on an electronic board. In another method, text strings to be displayed can be switched every defined period of time instead of employing the display in the flowing manner. When display contents are switched to be displayed every predetermined time in such a manner, both the master attribute information and the slave attribute information can be displayed.

In the present exemplary embodiment, a method for employing the display method illustrated in FIG. 12 or the display method illustrated in FIGS. 13A and 13B is determined based on the importance of destination information. However, any one of the methods can be set as a default or a user can set any one of the methods on a setting screen, not illustrated, regardless of the importance of the destination information.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-086271, filed Apr. 26, 2019, which is hereby incorporated by reference herein in its entirety.

What is claimed is:

1. An image processing apparatus comprising:
a memory storing instructions and a plurality of destination information; and
a processor configured to execute the instructions causing the image processing apparatus to:
accept input of a search key;
conduct a search for first attribute information and second attribute information associated with the first attribute information both of which are included in the plurality of destination information, based on the input search key; and
display destination information hit by the search as a result of the conducted search,
wherein a list window of the destination information includes a column of the first attribute information but does not include a column of the second attribute information,
wherein, in a case where the first attribute information included in the plurality of destination information is hit based on the input search key, the first attribute information included in the destination information is displayed and the second attribute information included in the destination information is not displayed, as the search result, in the column of the first attribute information, and
wherein, in a case where the second attribute information included in the plurality of destination information is hit based on the input search key, not only the first attribute information but also the second attribute information included in the destination information are displayed, as the search result, in the column of the first attribute information.

2. The image processing apparatus according to claim 1, wherein, in a case where not only the first attribute information but also the second attribute information included in the hit destination information are displayed and these pieces of information cannot be displayed within the screen indicating the search results, the first attribute information is partially omitted to be displayed or display contents are switched within a predetermined time and thus the first attribute information and the second attribute information are displayed.

3. The image processing apparatus according to claim 2, wherein a determination as to whether the first attribute information is partially omitted to be displayed or the display contents are switched within the predetermined time and thus the first attribute information and the second attribute information are displayed is made based on a type of the hit destination information.

4. The image processing apparatus according to claim 1, wherein, in a case where the first attribute information is a name, the second attribute information associated with the first attribute information is a phonetic text.

5. The image processing apparatus according to claim 1, wherein, in a case where the first attribute information is a facsimile number, the second attribute information associated with the first attribute information is a line number.

6. The image processing apparatus according to claim 1, wherein, in a case where the first attribute information is a host name, the second attribute information associated with the first attribute information is at least any one of a protocol, a folder name, and a user name.

7. A control method for an image processing apparatus, the control method comprising:
accepting input of a search key;
conducting a search for first attribute information and second attribute information associated with the first attribute information both of which are included in a plurality of destination information, based on the input search key; and
displaying destination information hit by the search as a result of the conducted search,
wherein a list window of the destination information includes a column of the first attribute information but does not include a column of the second attribute information,
wherein, in a case where the first attribute information included in the plurality of destination information is hit based on the input search key, the first attribute information included in the destination information is displayed and the second attribute information included in the destination information is not displayed, as the search result, in the column of the first attribute information, and
wherein, in a case where the second attribute information included in the plurality of destination information is hit based on the input search key, not only the first attribute information but also the second attribute information included in the destination information are displayed, as the search result, in the column of the first attribute information.

8. A non-transitory computer readable storage medium storing a computer program for making a computer execute a control method for an image processing apparatus, the control method comprising:
accepting input of a search key;

conducting a search for first attribute information and second attribute information associated with the first attribute information both of which are included in a plurality of destination information, based on the input search key; and displaying destination information hit by the search as a result of the conducted search, wherein a list window of the destination information includes a column of the first attribute information but does not include a column of the second attribute information, wherein, in a case where the first attribute information included in the plurality of destination information is hit based on the input search key, the first attribute information included in the destination information is displayed and the second attribute information included in the destination information is not displayed, as the search result, in the column of the first attribute information, and wherein, in a case where the second attribute information included in the plurality of destination information is hit based on the input search key, not only the first attribute information but also the second attribute information included in the destination information are displayed, as the search result, in the column of the first attribute information.

* * * * *